US008432923B2

(12) United States Patent
Ku

(10) Patent No.: US 8,432,923 B2
(45) Date of Patent: Apr. 30, 2013

(54) METHODS, SYSTEMS, AND COMPUTER PROGRAM PRODUCTS FOR PROVIDING INTER-CARRIER IP-BASED CONNECTIONS USING A COMMON TELEPHONE NUMBER MAPPING ARCHITECTURE

(75) Inventor: Bernard Ku, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 885 days.

(21) Appl. No.: 12/338,273

(22) Filed: Dec. 18, 2008

(65) Prior Publication Data
US 2010/0158229 A1 Jun. 24, 2010

(51) Int. Cl.
H04M 3/42 (2006.01)
(52) U.S. Cl.
USPC ........ 370/401; 370/352; 370/353; 370/395.2; 379/201.01; 379/201.03; 379/258
(58) Field of Classification Search .................. 370/352, 370/353, 395.2, 401; 709/203
See application file for complete search history.

(56) References Cited

U.S. PATENT DOCUMENTS

| 7,624,417 | B2 * | 11/2009 | Dua ............................... 725/114 |
| 7,787,445 | B2 * | 8/2010 | Marsico ........................ 370/352 |
| 7,944,912 | B2 * | 5/2011 | Kobayashi et al. ........... 370/352 |
| 7,948,967 | B2 | 5/2011 | Ku |
| 7,974,295 | B2 | 7/2011 | Tuohino et al. |
| 8,184,798 | B2 | 5/2012 | Wiatrowski et al. |
| 2006/0140200 | A1 | 6/2006 | Black et al. |
| 2007/0061397 | A1 * | 3/2007 | Gregorat et al. .............. 709/203 |
| 2007/0133574 | A1 * | 6/2007 | Tejani et al. .................. 370/401 |
| 2007/0165613 | A1 | 7/2007 | Soo et al. |
| 2007/0286379 | A1 | 12/2007 | Wiatrowski et al. |
| 2008/0002665 | A1 | 1/2008 | Soo et al. |
| 2008/0019356 | A1 | 1/2008 | Marsico |
| 2008/0025492 | A1 | 1/2008 | Heinze et al. |
| 2008/0198997 | A1 | 8/2008 | Sterman et al. |
| 2009/0227276 | A1 | 9/2009 | Agarwal et al. |
| 2010/0158201 | A1 | 6/2010 | Vijay Marathe et al. |
| 2011/0038468 | A1 | 2/2011 | Hannan et al. |
| 2011/0149956 | A1 | 6/2011 | Alt et al. |

FOREIGN PATENT DOCUMENTS

JP 2007243564 9/2007

OTHER PUBLICATIONS

Wikipedia, the free encyclopedia, "Telephone Number Mapping", http://en.wikipedia.org/wiki/Telephone_Number_Mapping, 7 pages, Last Downloaded: Oct. 17, 2008.
Faltstrom, "E.164 number and DNS", Network Working Group, Cisco Systems, Inc. (Sep. 2000), 10 pages, http://www.ietf.org/rfc/rfc2916.txt, Last Downloaded: Oct. 20, 2008.

(Continued)

*Primary Examiner* — Andrew Chriss
*Assistant Examiner* — Mohamed Kamara
(74) *Attorney, Agent, or Firm* — Myers Bigel Sibley & Sajovec

(57) ABSTRACT

A system includes a network entry point configured to receive and process internet protocol (IP) based connection requests originating from outside the communications network, and a telephone number mapping (ENUM) database configured to store a uniform resource identifier (URI) of the network entry point and to respond to a request for routing information for a subscriber terminal within the communications network received from a remote entity outside the communications network by providing a naming authority pointer resource (NAPTR) record including the URI of the network entry point to the remote entity in response to the request for routing information.

20 Claims, 10 Drawing Sheets

OTHER PUBLICATIONS

Wikipedia, the free encyclopedia, "Voice peering", http://en.wikipedia.org/wiki/Voice_peering, 1 page, Last Downloaded: Oct. 20, 2008.

Stastny et al., "ENUM—The bridge between telephony and Internet", Eurescom mess@ge, http://www.eurescom.de/message/messageSep2004/ENUM_The_bridge_between telephony_and_Internet, 4 pages, Last Downloaded: Oct. 20, 2008.

Höneisen et al., "SWITCH (The Swiss Education & Research Network)—Hitchhikers Guide to ENUM Services—ENUM Beyond SIP", Version 1.0, 13 pages (2005).

* cited by examiner

METHODS, SYSTEMS, AND COMPUTER PROGRAM PRODUCTS FOR PROVIDING INTER-CARRIER IP-BASED CONNECTIONS USING A COMMON TELEPHONE NUMBER MAPPING ARCHITECTURE

RELATED APPLICATIONS

The present application is related to co-pending and commonly assigned U.S. application Ser. No. 12/336,972, entitled "METHODS, SYSTEMS, AND COMPUTER PROGRAM PRODUCTS FOR ENABLING NON-IMS QUERIES OF A COMMON TELEPHONE NUMBER MAPPING SYSTEM" filed on Dec. 17, 2008, and to co-pending and commonly assigned U.S. application Ser. No. 12/338,259, entitled "METHODS, SYSTEMS, AND COMPUTER PROGRAM PRODUCTS FOR PROVIDING INTRA-CARRIER IP-BASED CONNECTIONS USING A COMMON TELEPHONE NUMBER MAPPING ARCHITECTURE" filed on Dec. 18, 2008, the disclosures of which are incorporated herein by reference.

BACKGROUND

The present disclosure relates to communications networks, and, more particularly, to routing IP-based connections between different network carriers.

Historically, voice telephone calls have been carried over circuit-switched telephone networks, such as the Public Switched Telephone Network (PSTN). The PSTN was originally designed to carry voice traffic over switched analog lines. However, the backbone transmission network of the PSTN is now entirely digital, although analog circuits are still used to connect some analog telephones to the PSTN. The PSTN is largely governed by technical standards created by the Telecommunication Standardization Sector of the International Telecommunication Union (ITU-T), and uses the well known E.164 addressing scheme. An E.164 telephone number has a ten-digit format (NPA-NXX-XXXX) including a three digit numbering plan area code (NPA), or area code for short, followed by a three digit exchange code (NXX) and a four digit station code (XXXX). When a telephone number is dialed on a PSTN-connected telephone, a dedicated circuit may be set up between the calling terminal and the called terminal, and voice communications are carried out using the circuit. Telephone calls that are set up in this manner over the PSTN are referred to as circuit-switched calls.

Although circuit-switched telephony is still in widespread use, a significant number of telephone calls are now being carried via packet-switched networks, such as networks that utilize the Internet Protocol (IP), which is the basic transmission protocol used for Internet communications. Voice-Over-Internet-Protocol (VoIP) is an industry standard that has evolved to enable users to place phone calls through a packet-switched network, such as the Internet, instead of through the PSTN. With VoIP, a voice signal is digitized and encoded into data packets, which are sent over a packet switched data communications network to a destination address. The packets are reassembled at the receiving terminal, and data in the packets is used to reconstruct the voice signal encoded therein. In contrast to a circuit-switched network, the packets in a packet-switched network may follow different paths from the originating terminal to the receiving terminal.

A conventional analog telephone may be connected to the Internet using an interface device that converts analog phone signals to digital signals. These digital signals may then be packetized and communicated over the Internet. A telephone call may thereby be communicated through the Internet to a VoIP provider, which converts the call back to an analog signal and places the call through a PSTN that is local to the called terminal. Alternatively, the VoIP provider can process the call entirely in digital form if the called terminal/telephone is also a VoIP phone. A user can thereby dial a telephone number in a conventional manner and have the call routed partly or entirely through the Internet, instead of through the PSTN. Similarly, an analog telephone can place a call to a VoIP telephone. The telephone call is routed through the PSTN to the VoIP provider, which converts the call into a digital signal, packetizes the digital information and transmits the packets to the called VoIP telephone.

Furthermore, some telephone carriers have converted their backbone networks to carry voice traffic, including even voice traffic that originates and terminates at analog telephones, using VoIP. VoIP is therefore expected to play a significant role in voice telephony in the future. However, the convergence of traditional analog telephony and VoIP telephony has been hampered by the fact that IP addressing is substantially different from E.164 addressing. As noted above, E.164 addressing uses the ten-digit NPA-NXX-XXXX addressing format. In contrast, IP communications utilize a 32-bit IP address, which is divided into four 8-bit numbers having a hierarchical relationship that designates a sub-network and a terminal within the sub-network.

Since the E.164 numbering system and the IP address system are separate, a VoIP telephone may be associated with both an IP address and an E.164 telephone number. Furthermore, a party calling a VoIP telephone using an E.164 telephone number may not be aware of the IP address of the VoIP telephone.

SUMMARY

A communications network according to some embodiments includes a network entry point configured to receive and process internet protocol (IP) based connection requests originating from outside the communications network, and a telephone number mapping (ENUM) database configured to store a uniform resource identifier (URI) of the network entry point and to respond to a request for routing information for a subscriber terminal within the communications network received from a remote entity outside the communications network by outputting a naming authority pointer resource (NAPTR) record including the URI of the network entry point to the remote entity in response to the request for routing information.

In some embodiments, the network entry point includes a session border controller (SBC) that is configured to receive an incoming call setup request to set up a call with the subscriber terminal and to set up the call in response to the incoming call setup request.

The communications network may further include a private ENUM database configured to store internal routing information for subscriber terminals in the communications network and to respond to requests for routing information from entities within the communications network, and an IP multimedia subsystem (IMS) core configured to manage voice over IP (VoIP) communications sessions. The SBC may be configured to forward the incoming call setup request to the IMS core, and the IMS core may be configured to query the private ENUM database to obtain internal routing information for routing the call to the subscriber terminal.

The IMS core may be configured to forward the internal routing information obtained from the private ENUM database to the SBC, and the SBC may be configured to establish a connection with the subscriber terminal using the internal routing information provided from the IMS core.

The communications network may further include a master ENUM database that is configured to store routing information for subscriber terminals within the communications network and to populate the ENUM database and the private ENUM database.

The master ENUM database may store routing information for terminals in a plurality of communications systems operated by the communications service provider. At least one of the plurality of communications systems may include a mobility communications service.

In some embodiments, the ENUM database may be configured to provide a NAPTR record containing a session initiation protocol (SIP) URI in response to the request for routing information.

The IMS core may be further configured to receive an outgoing call setup request from a subscriber terminal within the communications network and to issue a query to the private ENUM database in response to the outgoing call setup request to obtain routing information for a destination terminal specified in the call setup request. The private ENUM database may be configured to determine whether the destination terminal is located within the communications network or within an external network and, in response to determining that the destination terminal is located within the external network, to issue a query to a ENUM database in the external network to obtain routing information for the destination terminal, the routing information for the destination terminal including a URI of a network entry point in the external network.

The IMS core may be configured to establish the outgoing call through the SBC in response to the routing information provided by the ENUM database in the external network.

The communications network may further include a non-IMS communication facility that is configured to issue a query for routing information to the private ENUM database.

Some embodiments provide methods of establishing an IP-based communications session with a subscriber terminal in a communications network. The methods include providing a telephone number mapping (ENUM) database that stores a uniform resource identifier (URI) of a network entry point in the communications network that receives and processes internet protocol (IP) based connection requests originating from outside the communications network, receiving a request for routing information for the subscriber terminal from a remote entity outside the communications network, and responding to the request for routing information by outputting a naming authority pointer resource (NAPTR) record including the URI of the network entry point to the remote entity.

The methods may further include receiving an incoming call setup request at a network entry point in the communications network to set up a call with the subscriber terminal, and setting up the call in response to the incoming call setup request.

The methods may further include storing internal routing information for subscriber terminals in the communications network at a private ENUM database, querying the private ENUM database from within the communications network to obtain internal routing information for routing the call to the subscriber terminal, and establishing a connection with the subscriber terminal using the internal routing information.

Outputting the NAPTR record may include outputting a NAPTR record containing a session initiation protocol (SIP) URI in response to the request for routing information.

The methods may further include receiving an outgoing call setup request from a subscriber terminal within the communications network, issuing a query to the private ENUM database in response to the outgoing call setup request to obtain routing information for a destination terminal specified in the call setup request, determining whether the destination terminal is located within the communications network or within an external network, and in response to determining that the destination terminal is located within the external network, issuing a query to an ENUM database in the external network to obtain routing information for the destination terminal, the routing information for the destination terminal including a URI of a network entry point in the external network.

In some embodiments, the methods may include establishing the outgoing call through a session border controller in response to the routing information provided by the ENUM database in the external network.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
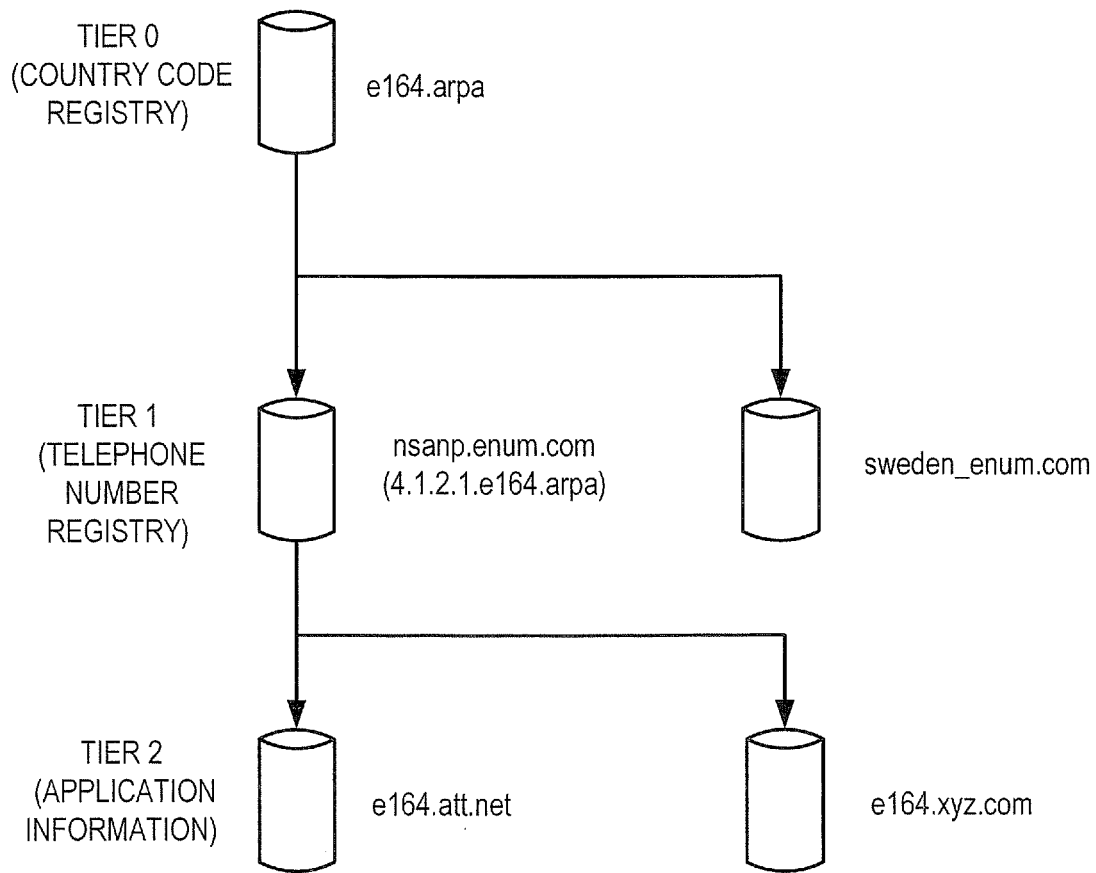
FIG. 1 is a schematic diagram illustrating the public ENUM infrastructure.

Embodiments are described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

TElephone NUmber Mapping (ENUM) is a suite of protocols that was designed to unify the E.164 telephone numbering system with the Internet Protocol addressing system. ENUM uses an indirect lookup method to obtain Naming Authority Pointer Resource (NAPTR) records associated with VoIP terminals from a network-based Domain Name Server (DNS) database, based on the E.164 telephone number of a VoIP terminal. A NAPTR record includes, among other things, information that designates how and where the VoIP terminal can be contacted. For example, a NAPTR record can designate what types of communications a terminal can establish, such as a VoIP connection using Session Initiation Protocol (SIP), a voice connection using the E.164 telephone number, a short message service (SMS) or multimedia message service (MMS) session, etc. The NAPTR may provide a uniform resource identifier (URI) that identifies how to contact the terminal to use a selected service, and may designate a priority for each of the various connection methods.

A NAPTR record for a VoIP terminal may be accessed using a URI/domain name that is mapped to the E.164 number assigned to the terminal. For example, the hypothetical E.164 number +1(214)111-2222 maps to the domain name 2.2.2.2.1.1.1.4.1.2.1.e164.arpa. That is, to construct the domain name associated with the NAPTR record for a particular E.164 telephone number, the numbers in the E.164 telephone number are reversed and separated by dots, and the domain suffix "e164.arpa" is appended to the string. In this manner, each E.164 number maps to a unique URI/domain name.

FIG. 1 generally illustrates the public ENUM infrastructure, which has a multiple tiered hierarchical structure. As illustrated in FIG. 1, Tier 0 represents the country code registry, which is used to provide information for obtaining NAPTR records for inter-country ENUM queries. Tier 1 of the ENUM infrastructure provides a telephone number registry that responds to intra-country queries. Tier 1 may be subdivided into additional tiers that service different area codes, for example.

Tier 2 of the ENUM infrastructure represents private ENUM databases, such as the ENUM databases provided by particular communication service providers. A private ENUM database typically only includes routing information for subscribers within a single network operated by a particular communication service provider. Additionally, third parties can provide Tier 2 database services to a variety of entities, including carriers.

As an example, a query can be issued to a Tier 2 ENUM database, such as the e164.att.net Tier 2 database illustrated in FIG. 1, from a terminal or from the IP multimedia subsystem (IMS) core within a network in which the Tier 2 database resides. For example, a query to the e164.att.net Tier 2 database can request routing information for a terminal that has the E.164 number+1 (512) 111-2222. To form the query, the E.164 number is re-formatted as an ENUM domain, and a query is constructed as follows:

$ORIGIN 2.2.2.2.1.1.1.2.1.5.1.e164.arpa

The query is transmitted to the e164.att.net Tier 2 database. If the ENUM address is known to the e164.att.net Tier 2 database, then the e64.att.net Tier 2 database may return a NAPTR record including an entry as shown below.

IN NAPTR 100 10 "u" "sip+E2U" "!^.*$!sip:+15121112222@att.net"

The NAPTR record entry shown above provides call routing information for routing a SIP-based VoIP call to the called terminal. In particular, the NAPTR record includes a uniform resource identifier (URI) that can be used to establish the session. The NAPTR record contains a number of other fields, including call logic and processing fields that indicate relative priorities for different types of communications.

If the e164.att.net Tier 2 database does not have a record corresponding to the terminal identified in the query, the Tier 2 database may issue a secondary ENUM query to a Tier 1 database to obtain further information about where the desired NAPTR record can be obtained. For example, suppose that the original query to the Tier 2 database e164.att.net specified an ENUM domain 2.2.2.2.1.1.1.4.1.2.1.e164.arpa that is not known to the Tier 2 database e164.att.net. Then, a secondary ENUM query may be issued to a Tier 1 database associated with the numbering plan area (NPA) of the terminal named in the query. Thus, for example, a secondary query may be issued to a Tier 1 database associated with the domain 4.1.2.1.e164.arpa. The query to the Tier 1 database may be formed as follows:

$ORIGIN 4.1.2.1.e164.arpa

The Tier 1 database may respond to the query by providing a name server (NS) record that specifies a range of numbers whose routing information is known to the Tier 1 database. That is, the response from the Tier 1 database identifies the Tier 2 databases known to the Tier 1 database along with ranges of numbers managed by the Tier 2 databases. For example, the Tier 1 database may respond with an NS record that indicates that the desired number is managed by the Tier 2 database at the domain e164.xyz.com. The original query may then be forwarded to the appropriate Tier 2 database for fulfillment.

If the target terminal specified in the query is not within a range of numbers known to the Tier 1 database, then the Tier 1 database may issue a tertiary ENUM query to the Tier 0 database. The Tier 0 database may respond by identifying the appropriate country registry that can be used to satisfy the query. For example, suppose that the original query to the Tier 2 database e146.att.net specified an ENUM domain 2.2.2.2.1.1.1.4.1.2.4.4.e164.arpa that is not known to the Tier 2 database e164.att.net or to the Tier 1 database 4.1.2.1.e164.arpa. In that case, a query such as $ORIGIN e164.arpa can be issued to the Tier 0 database. The Tier 0 database responds with an identification of a Tier 1 database that can provide routing information for the target number. For example, the Tier 0 database may respond with an NS record such as the following:

4.4 IN NS sweden_enum.com

Thus, a secondary query can be issued to the Tier 1 database sweden_enum.com to obtain routing information for the specified number.

Figure 2:
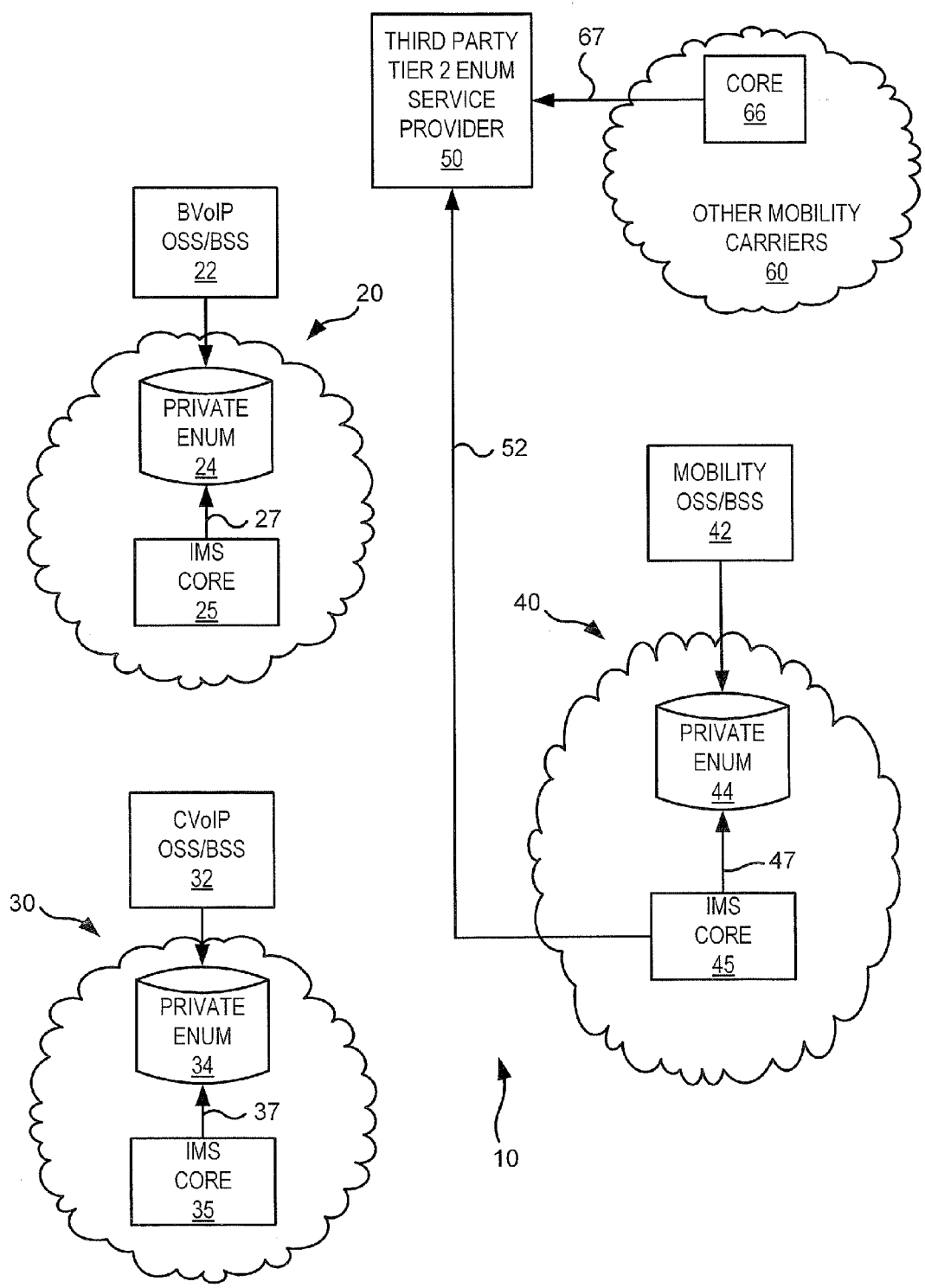
FIG. 2 illustrates a communications system including multiple communications services using private ENUM facilities.

VoIP and telephone carriers can also use ENUM and ENUM-like facilities for routing within their networks and to/from other carriers' networks. For example, FIG. 2 illustrates a network configuration 10 for an exemplary telecommunications provider that operates multiple networks that can potentially employ VoIP-type services for call routing. For example, a telecommunications provider may operate a Business VoIP system (BVoIP) 20, a consumer VoIP system (CVoIP) 30 and a wireless (i.e., mobility) system 40. Each of the services includes an Operations Support System/Business Support System (OSS/BSS), which is a computer system that performs network related processes, such as maintaining network inventory, provisioning services, configuring network components, and managing faults, as well as customer support processes, such as taking orders, processing bills, and collecting payments. As the systems are typically managed separately, the BVoIP system 20 includes an OSS/BSS 22, the CVoIP system 30 includes an OSS/BSS 32, and the mobility system 40 includes an OSS/BSS 42.

Each of the systems 20, 30, 40 also includes a dedicated private ENUM database that can be used to store NAPTR records for use in call routing within the system. For example, the BVoIP system 20 can include a private ENUM database 24, the CVoIP system 30 can include a private ENUM database 34, and the mobility system 40 can include a private ENUM database 44. Each of the private ENUM databases 24, 34, 44 is populated by information provided by the OSS/BSS 22, 32, 42 of its respective system. Furthermore, each of the private ENUM databases responds to queries originating from within its respective system, and provides NAPTR records that can be used for call routing within its respective system.

The BVoIP system 20, the CVoIP system 30 and the mobility system 40 each includes a respective IP multimedia subsystem, or "IMS" core 25, 35, 45. "IMS" refers to a standardized framework for delivering IP multimedia communications services. IMS may be used to facilitate the access of multimedia and voice applications, such as VoIP, over an IP network. Thus, in the BVoIP system 20, the CVoIP system 30 and the mobility system 40, the respective IMS core 25, 35, 45 handles the processing associated with establishing and maintaining VoIP calls, as well as the use of VoIP routing for non-VoIP calls. As illustrated in FIG. 2, in each system, the IMS core 25, 35, 45 can send a respective query 27, 37, 47 to the private ENUM database 24, 34, 44 within its respective system to obtain call routing information for routing calls within the network. It will be appreciated, however, that the private ENUM databases 24, 34, 44 may only provide ENUM based routing information and services to entities within their respective systems 20, 30, 40, and, in particular, only to authorized entities within those systems, such as the IMS cores 25, 35, 45. The private ENUM databases may not be accessible outside the systems (to respond to queries from other carriers for routing information, for example), because providing such routing information outside the system may undesirably expose proprietary information about network architectures, routing schemes, and the like, to third parties. The private ENUM databases also may not be accessible to systems operated by the same carrier (e.g., the private ENUM database 24 may not be accessed by the IMS core 35 or any other entity within the CVoIP system 30).

For telephone calls directed to terminals outside the network administered by a system 20, 30, 40, the IMS core 25, 35, 45 can issue a query 52 to a third party Tier 2 ENUM service provider 50. If the receiving terminal is known to the third party Tier 2 ENUM service provider 50, the third party Tier 2 ENUM service provider 50 can respond to the query with a NAPTR record that indicates how to route a particular telephone call to the receiving terminal.

As illustrated in FIG. 2, the third party Tier 2 ENUM service provider 50 can process queries from many different communications providers. For example, a third party carrier 60 may include a core 66 that can also issue queries 67 to the third party Tier 2 ENUM service provider 50, for example, to obtain routing information for calls addressed to terminals within the mobility system 40. However, it will be appreciated that the communications providers must pay to access the third party Tier 2 ENUM service, and may have to pay to list routing information with the third party Tier 2 ENUM service provider 50 regarding terminals within their respective networks. Thus, relying on third party Tier 2 ENUM service providers to obtain critical routing information may not be ideal. Furthermore, as explained above, it is generally undesirable to provide comprehensive ENUM routing information to a third party communication service provider. Thus, it may not be desirable to permit third party communication service providers to directly query a private Tier 2 ENUM database for call routing information.

Accordingly, some embodiments provide systems and/or methods that provide a common ENUM architecture that facilitates inter-carrier communications without having to rely on third party Tier 2 ENUM service providers. A common ENUM architecture according to some embodiments includes a three-level hierarchy of ENUM database servers, including a two-level private ENUM architecture that is at least partially accessible by permitted third parties. In particular, an ENUM architecture according to some embodiments for a communications service provider includes an industry-level Tier 0/1 ENUM database that can be queried by any communication service provider.

An architecture according to some embodiments also includes a private ENUM database that is accessible only from within the network of the communications service provider (the "home network"). The private ENUM database, which is similar to the private ENUM databases 24, 34, 44 illustrated in FIG. 2, is not accessible from outside the home network. Thus, ENUM responses provided by the private ENUM database can include complete routing information. Furthermore, the private ENUM database may be accessed by multiple communications systems 20, 30, 40 operated by the same carrier.

In addition to the private ENUM database, an architecture according to some embodiments includes a Tier 2* ENUM database. A Tier 2* ENUM database according to some embodiments is different from a conventional Tier 2 ENUM database, in that the database is accessible to approved third party communication service providers, and is typically not queried by devices within the home network. However, the routing information provided by the Tier 2* ENUM database does not provide full routing information in response to a query. Rather, a Tier 2* ENUM database according to some embodiments may only provide information sufficient to identify a network entry point or gateway that can be used to route a communication to a particular terminal. Thus, a Tier 2* ENUM database can provide information that is sufficient to allow a third party communication service provider to route a call to a terminal in the carrier's home network without providing complete routing information to the third party.

Figure 3:
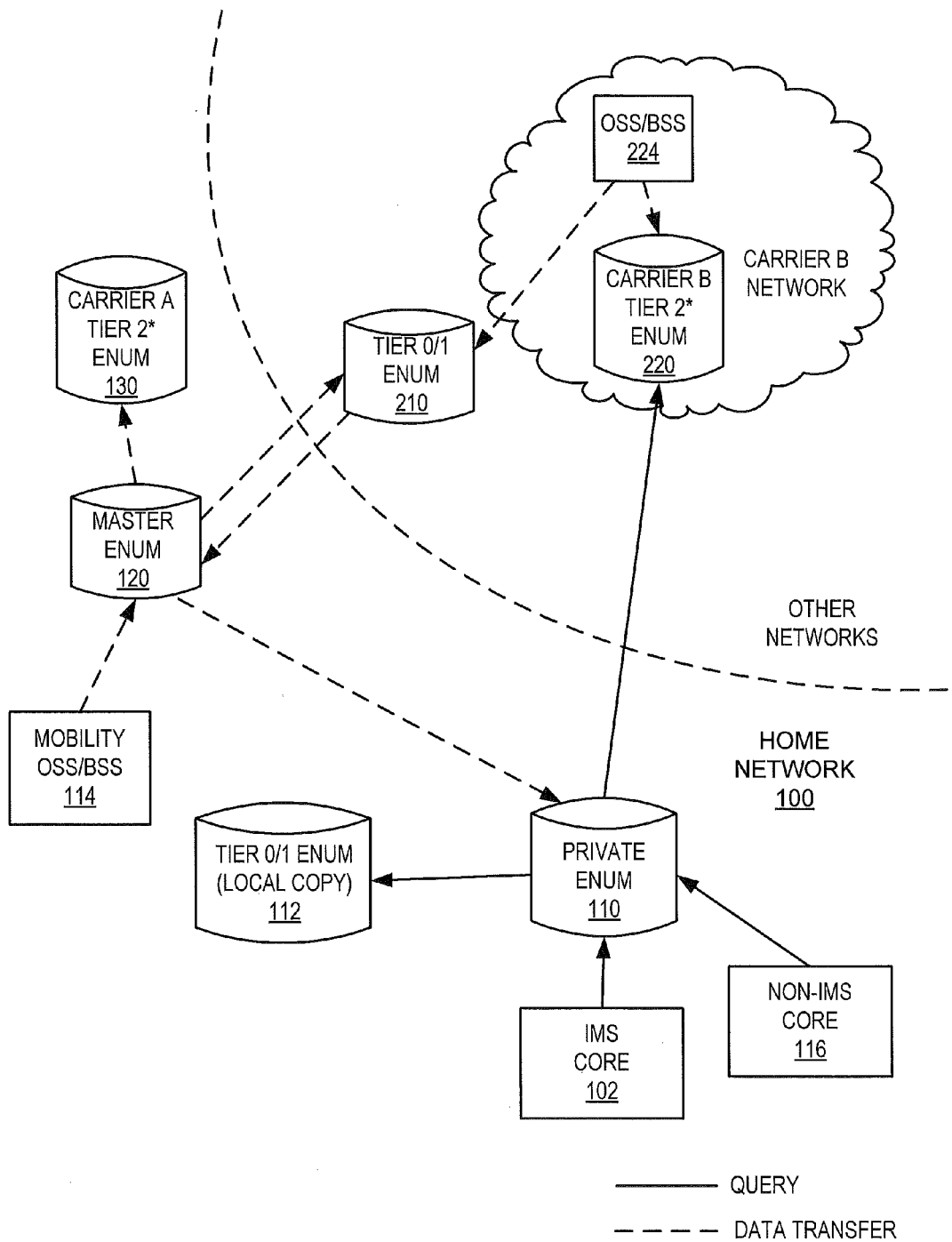
FIG. 3 is a block diagram of a communications system in which some embodiments can be implemented.

An ENUM architecture according to some embodiments is illustrated in FIG. 3. As shown therein, the home network of a communications service provider (Carrier A) includes a home network 100 in which voice calls and other communications sessions can be transported using IP protocols. The home network 100 therefore includes an IMS core 102 that handles establishment, maintenance and take-down of IP communication sessions. The home network 100 further includes a private ENUM database 110, and may further include a local copy 112 of the Tier 0/1 ENUM database that is obtained from a Tier 0/1 ENUM database 210 located outside the home network of Carrier A.

A master ENUM database 120 contains complete routing information for all terminals within the home network. The master ENUM database 120 is populated with information supplied by an OSS/BSS 114 which, as shown, may service more than one communications system within the home network. For example, the OSS/BSS may service both a landline communication system and a wireless communication system within the home network 100. In some embodiments, the master ENUM database 120 and the private ENUM database 110 can be implemented in the same database facility.

Furthermore, a Tier 2* ENUM database 130 that is accessible by third party carriers is also provided. The private ENUM database 110 and the Tier 2* ENUM database 130 are both populated with information supplied from the master ENUM database 120. It will be appreciated that the Tier 2* ENUM database 130 is not supplied with complete routing information for each terminal within the home network. Rather, the Tier 2* ENUM database is supplied only with information sufficient to identify a network entry point for each terminal within the home network. In contrast, the private ENUM database 110 stores internal routing information for each terminal in the home network 100. Thus, a NAPTR record provided by the private ENUM database 110 may, for example, include a URI that points to the actual terminal, rather than to a network entry point.

Also illustrated in FIG. 3 are an industry Tier 0/1 ENUM database 210 that is populated with information provided by cooperating communication service providers, such as Carrier A. Other carriers may also maintain their own Tier 2* ENUM databases 220 that are accessible by other communication service providers, such as Carrier A. The Tier 2* ENUM database is populated by the OSS/BSS 224 of its respective communication service provider.

As shown in FIG. 3, the private ENUM database 110 can be queried by both the IMS core 102, as well as by the non-IMS core 116. The private ENUM database 110 can consult the local copy of the Tier 0/1 database to fulfill queries, if necessary. Likewise, the private ENUM database 110 can also consult the Tier 2* ENUM databases of other carriers, such as the Tier 2* ENUM database 220 of Carrier B, if it is determined that a called terminal is located in a network operated by Carrier B. Similarly, the Tier 2* database 130 of Carrier A can be queried by third parties outside the home network.

Figure 4:
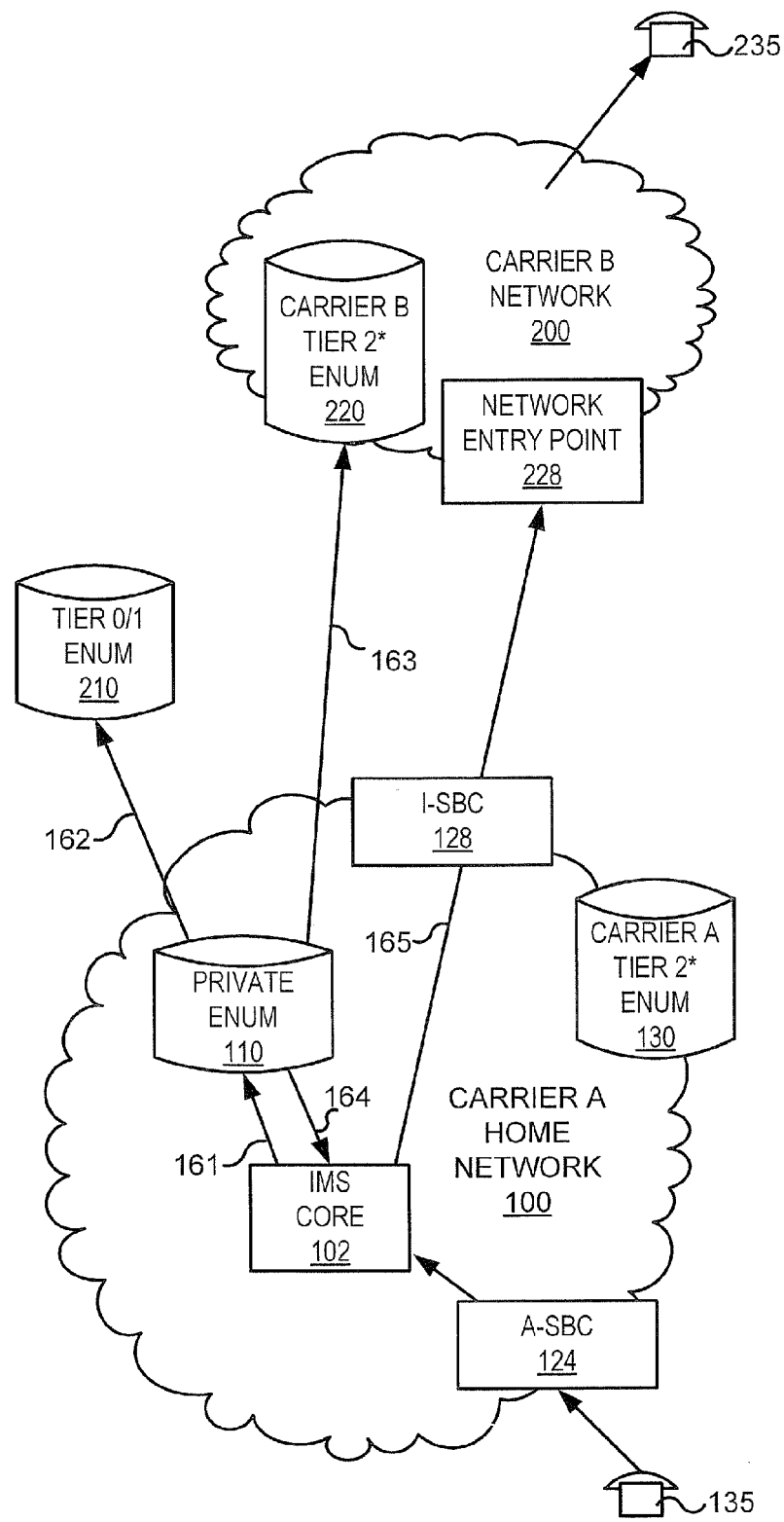
FIG. 4 is a block diagram that illustrates routing of a VoIP call to a terminal in an external network using ENUM facilities according to some embodiments.

Operations associated with calling into and out of the home network will now be discussed in connection with FIGS. 4 and 5. Some exemplary operations associated with calling a terminal in a third party network from a home network are illustrated in FIG. 4. As shown therein, a home network 100 includes an IMS core 102, a private ENUM database 110 and a Tier 2* ENUM database 130.

The home network 100 may be accessed through one or more session border controllers, such as the interconnected session border controller (I-SBC) 128 and the access-edge session border controller (A-SBC) 124. In general, a session border controller (SBC) is a device that is used by VoIP providers to control signaling and media streams involved in setting up, conducting and taking down VoIP calls. Thus, an SBC may be placed in the VoIP signaling path between the calling and called terminals. In addition to call setup and takedown, an SBC can provide, among other things, access control, and data conversion services for the calls they control. In some cases, an SBC can act as a user agent for a terminal within its network, which allows a network to exercise additional control over calls within the network.

As an example, a terminal 135 that is serviced by the home network 100 may attempt to place a call to a remote terminal 235 that is serviced by a third party communication service provider, Carrier B. In order to establish the call, the user of the terminal 135 may dial a 10-digit E.164 telephone number, which is provided to the access-edge SBC 124. The A-SBC 124 routes the call request to the IMS core 102. In order to set up the call, the IMS core 102 issues a query 161 to the private ENUM database 110 of the home network 100 in an attempt to obtain an NAPTR record associated with the E.164 address dialed by the user. Because the E.164 number dialed by the user corresponds to a remote terminal 235 that is not serviced by the home network 100, the private ENUM database 110 would not find an entry for the called E.164 number.

Having failed to find a record corresponding to the called E.164 number, the private ENUM database 110 issues a query 162 to the Tier 0/1 ENUM database 210 (or a local copy 112 of the Tier 0/1 ENUM database) for the called E.164 number. In this example, the Tier 0/1 database 210 finds an entry for the called E.164 number and returns an NS record with the address of the Tier 2* ENUM database for the carrier of record of the E.164 number (in this example, Carrier B). For example, assuming the called telephone number is (512) 111-2222, the Tier 0/1 database 210 may return an NS record that identifies the Tier 2* ENUM database 220 for the carrier of record for the called number as follows:

2.2.2.2.1.1.1.2.1.5.1 IN NS tier2enum.carrier_b.net

The private ENUM database 110 next issues a query 163 to the Tier 2* ENUM database 220 identified in the NS record provided by the Tier 0/1 database 210. For example, the query 163 issued by the private ENUM database 110 may have the form:

$ORIGIN 2.2.2.2.1.1.1.2.1.5.1.e164enum.net

In response, the Tier 2* ENUM database 220 in the third party network may provide a NAPTR record identifying a gateway where Carrier B desires to receive calls for the called terminal 235. For example, the NAPTR record returned by the Tier 2* database 220 may have the following form:

NAPTR 10 100 "u" "E2U+sip" "!^.*$!sip:gw02@carrier_b.net"

Note that the URI in the NAPTR record (sip:gw02@carrier_b.net) directs the call not to the terminal 235, but to a network entry point 228, such as a gateway or other network interface device, within Carrier B's network. That is, the routing information provided by the Tier 2* ENUM database 220 of the third party carrier may not provide complete routing information for the SIP connection. However, the Tier 2* ENUM database 220 does provide sufficient information to the private ENUM database 110 of the home network 100 to allow the call to be established. The private ENUM database 110 next sends a message 164 that contains the NAPTR record returned by the Tier 2* ENUM database 220 to the IMS core 102. The IMS core 102 then forwards call processing information 165 to the network entry point 228 of the third party carrier that was identified in the URI of the NAPTR record provided by the Tier 2* ENUM database 220 through the I-SBC 128. For example, the IMS core 102 may send a SIP INVITE message to the network entry point 228 associated with the URI in the NAPTR record returned by the Tier 2* ENUM database 220. Call setup may then proceed in a conventional manner with the network entry point 228 functioning as an agent for the called terminal 235.

Figure 5:
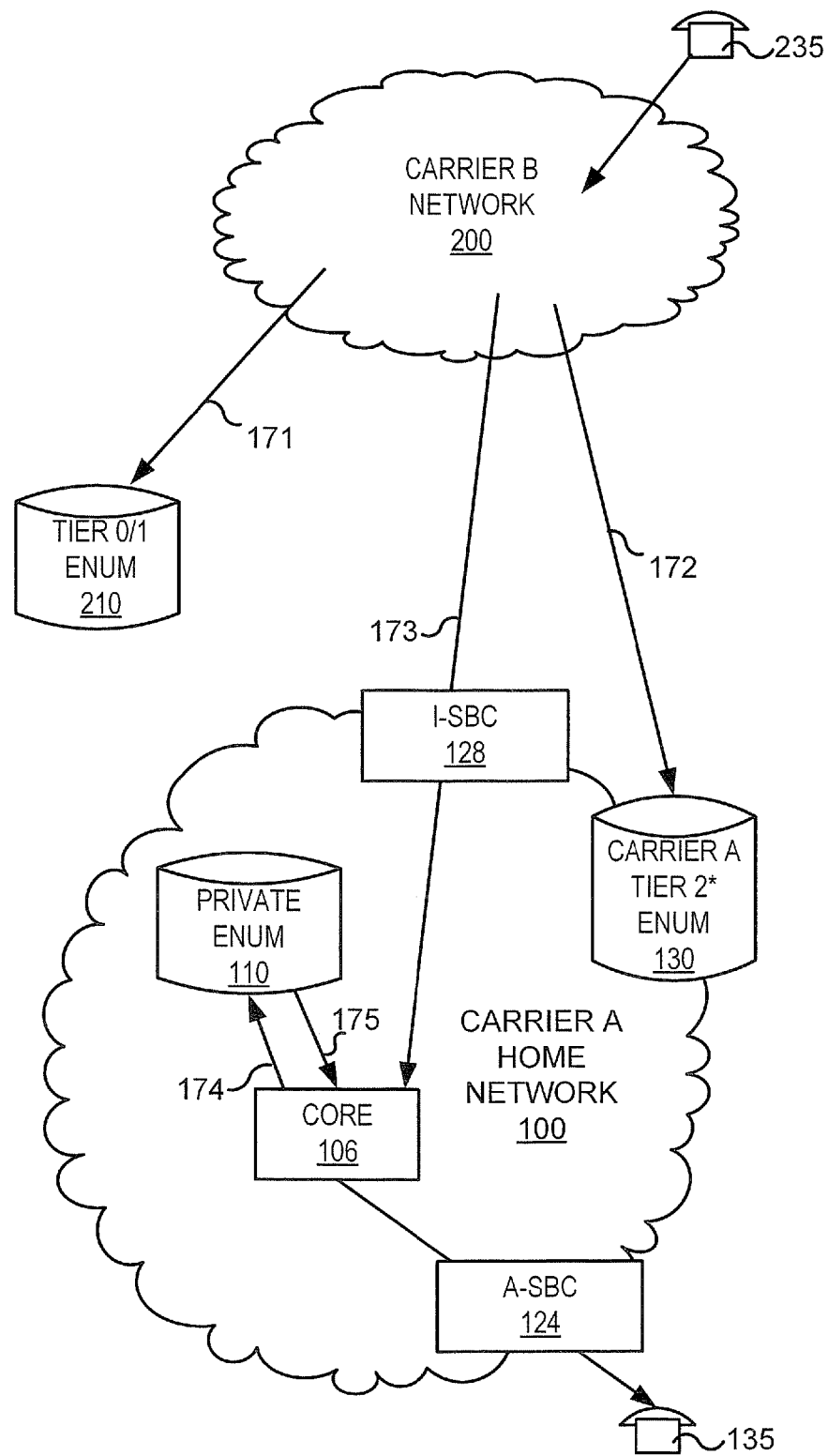
FIG. 5 is a block diagram that illustrates routing of an incoming VoIP call using ENUM facilities according to some embodiments.

Some exemplary operations associated with calling a terminal in the home network from a third party network are illustrated in FIG. 5. As shown therein, when a call is placed from a terminal 235 in a third party network 200 to the terminal 135 in the network 100 of Carrier A, the third party network carrier (Carrier B) issues a query 171 to the Tier 0/1 ENUM database 210. The Tier 0/1 ENUM database returns an NS record with the address of the Tier 2* ENUM database 130 for Carrier A, the carrier of record for the called terminal 135. Next, Carrier B issues a query 172 to the Tier 2* ENUM database 130 for Carrier A requesting routing information for the called terminal. The Tier 2* ENUM database 130 for Carrier A responds with an NAPTR record identifying the connection point for routing the call to the called terminal 135. For example, the NAPTR record returned by the Tier 2* ENUM database 130 may have the following form:

NAPTR 10 100 "u" "E2U+sip" "!^.*$!sip:isbc03@carrier_a.net"

That is, the NAPTR record returned by the Tier 2* ENUM database 130 may include a URI identifying the I-SBC 128 as the connection point for establishing the call. The NAPTR record provided by the Tier 2* ENUM database 130 does not contain complete routing information for the SIP connection. For example the NAPTR record does not include a URI for the called terminal itself. However, the NAPTR record provided by the Tier 2* ENUM database 130 does provide enough information for the third party network 200 to route the call.

Next, Carrier B forwards call processing information 173, such as a SIP INVITE message, to the connection point identified in the NAPTR record, namely, the I-SBC 128, which forwards the call processing information 173 to the IMS core 102.

Next, the IMS core 102 issues a query 174 to the private ENUM database 110 to obtain call routing information for the call. The private ENUM database 110 responds to the query from the IMS core 102 with internal routing instructions 175 that may include multiple NAPTR records. For example, the private ENUM database 110 may respond with NAPTR records specifying connection parameters for a SIP connection, a voice connection, an SMS connection, etc. Based on the service type requested by the originating carrier, the IMS core 102 chooses an appropriate NAPTR record and uses the URI specified in the NAPTR record to set up the session. In some embodiments, the IMS core can instruct the I-SBC 128 to establish the session using the URI specified in the NAPTR record.

Figure 6:
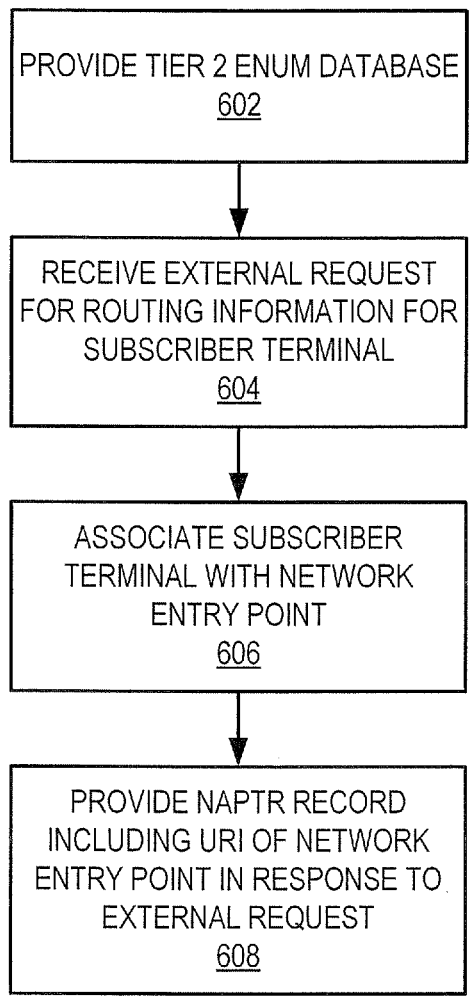
FIG. 6 is a flowchart that illustrates some operations related to a Tier 2 ENUM database according to some embodiments.
Figure 7:
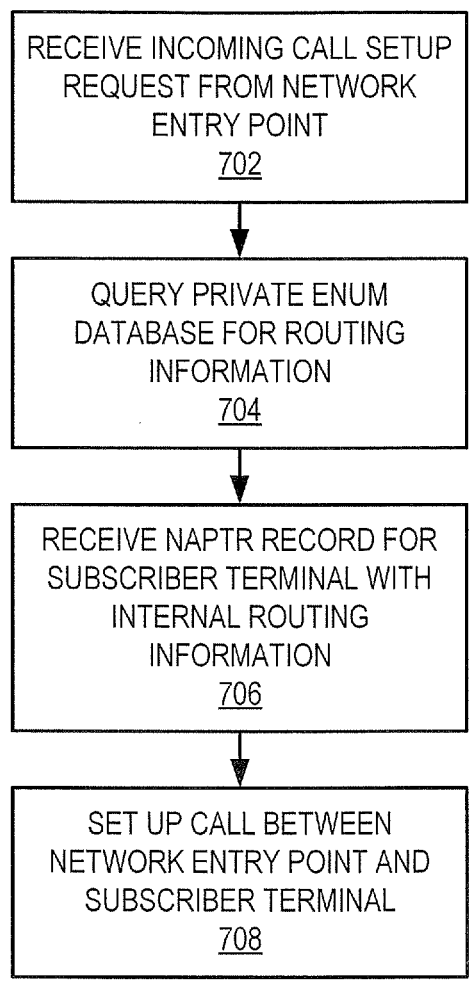
FIG. 7 is a flowchart that illustrates some operations of an IMS core in setting up an incoming call according to some embodiments.
Figure 8:
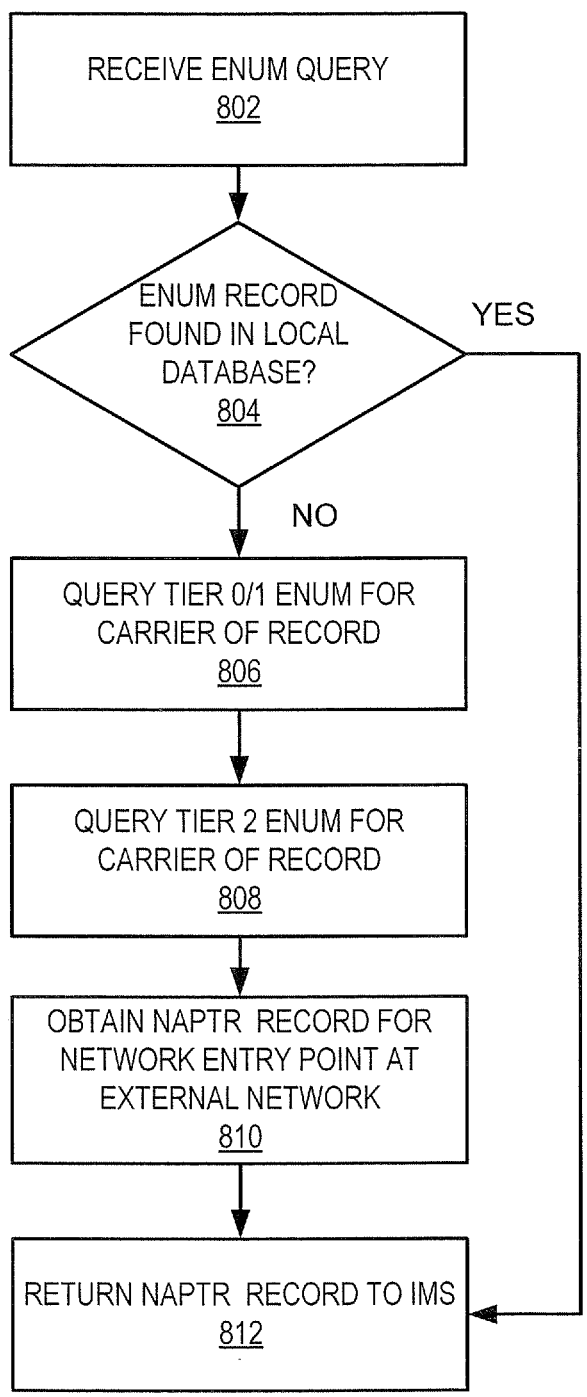
FIG. 8 is a flowchart that illustrates some operations of a private ENUM database in setting up an outgoing call according to some embodiments.
Figure 9:
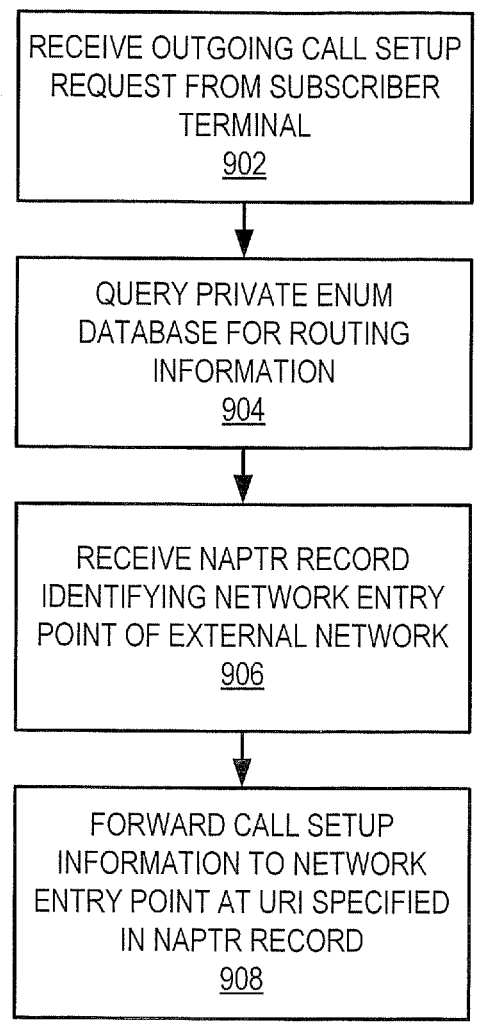
FIG. 9 is a flowchart that illustrates some operations of an IMS core in setting up an outgoing call according to some embodiments.

Operations of various network elements according to some embodiments are illustrated in FIGS. 6-9. For example, FIG. 6 illustrates some operations related to a Tier 2* ENUM database 130, FIG. 7 illustrates some operations of an IMS core 102 in setting up an incoming call, FIG. 8 illustrates some operations of a private ENUM database 110 in setting up an outgoing call, and FIG. 9 illustrates some operations of an IMS core 102 in setting up an outgoing call.

Referring to FIG. 6, a Tier 2* ENUM database is provided (block 602), and an external request for routing information is received at the Tier 2* ENUM database (block 604). That is, the Tier 2* ENUM database 130 receives a request for routing information for a subscriber terminal located within the home network 100 of the Tier 2* ENUM database 130. The home network 100 of the Tier 2* ENUM database includes a network entry point, such as an SBC 128. The Tier 2* ENUM database associates the subscriber terminal with the network entry point 128 (Block 606). The association may be made by reference to a lookup table that associates subscriber terminals with network entry points. Alternatively or additionally, the association may be made dynamically based on factors such as network conditions, loading, quality of service, etc. Once the subscriber terminal has been associated with a network entry point 128, the Tier 2* ENUM database 130 provides the requestor with a NAPTR record including the URI of network entry point 128 associated with the subscriber terminal (block 608).

FIG. 7 illustrates some operations of an IMS core 102 in setting up an incoming call. Referring to FIG. 7, an IMS core 102 receives an incoming call setup request from a network entry point, such as the I-SBC 128 (block 702). The IMS core 102 next queries the private ENUM database 110 in the home network 100 to obtain routing information for the subscriber terminal identified in the call setup request (block 704). The IMS core 102 then receives a NAPTR record for the subscriber terminal that includes internal routing information for the subscriber terminal (block 706). Finally, the IMS core 102 sets up the call between the network entry point and the subscriber terminal (block 708).

FIG. 8 illustrates some operations of a private ENUM database 110 in setting up an outgoing call. As illustrated therein, the private ENUM database 110 receives an ENUM query (block 802). The private ENUM database 110 then checks to see if a corresponding ENUM record is found in the private ENUM database 110 (block 804). If a corresponding record is found, the private ENUM database 110 returns a NAPTR record to the IMS core 102 (block 812). However, if an ENUM record is not found in a local database (indicating that the destination terminal is not serviced by the home network 100 of the private ENUM database 110), the private ENUM database 110 issues a query to a Tier 0/1 ENUM database to identify the carrier of record of the destination terminal (block 806). The query to the Tier 0/1 database may be issued to a local copy of the Tier 0/1 ENUM database maintained in the home network 100, or alternatively may be issued to a Tier 0/1 ENUM database located outside the home network 100.

In response, the private ENUM database 110 receives a name server (NS) record from the Tier 0/1 ENUM database that identifies the carrier of record of the destination terminal. The private ENUM database 110 then issues a query to the Tier 2* ENUM database for the carrier of record (block 808). A NAPTR record for the network entry point at the external network of the carrier of record is obtained in response to the query (block 810). The private ENUM database 110 then returns the NAPTR record to the IMS core 102 (block 812), which uses the NAPTR record to set up the outgoing call.

FIG. 9 illustrates some operations of an EMS core 102 in setting up an outgoing call. Referring to FIG. 9, an IMS core 102 receives an outgoing call set up request from a subscriber terminal within the home network 100 of the IMS core 102 to a terminal located outside the home network 100 (block 902). The IMS core then issues a query to the private ENUM database 110 of the home network 100 to obtain routing information for the destination terminal identified in the call set up request (block 904). In response, the IMS core receives a NAPTR record identifying a URI of the network entry point of the external network (block 906). The IMS core then forwards the call setup information to the network entry point at the URI specified in the NAPTR record (block 908).

Accordingly, some embodiments permit a communication service provider to establish an IP connection between subscribers of the provider's home network to IP endpoints of other networks using a common ENUM solution that requires minimal or no involvement of third party ENUM providers. A system according to some embodiments can be utilized by multiple communications systems operated by a single communication service provider. For example, the system can be used concurrently by wireless, landline, and VoIP systems operated by the same carrier to establish IP based connections with terminals within and/or outside the home network of the communication service provider. Furthermore, some embodiments permit cooperation among multiple independently operated communication networks to allow efficient routing of calls without exposing details of internal network routing and architecture to competing providers. The existence of such a system may provide a smoother path towards establishing cooperative relationships between providers in the area of call routing, which may enhance the overall customer experience while reducing costs.

Embodiments may take the form of an entirely hardware embodiment, an entirely software embodiment or an embodiment combining software and hardware aspects. Computer program code for carrying out operations of systems described above may be written in a high-level programming language, such as C or C++, for development convenience. In addition, computer program code for carrying out operations of embodiments may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Exemplary embodiments may take the form of systems, methods, and/or computer program products. Accordingly, exemplary embodiments may be embodied in hardware and/or in software (including firmware, resident software, micro-code, etc.). Furthermore, exemplary embodiments may take the form of a computer program product on a computer-usable or computer-readable storage medium having computer-usable or computer-readable program code embodied in the medium for use by or in connection with an instruction execution system. In the context of this document, a computer-usable or computer-readable storage medium may be any tangible medium that can store the program for use by or in connection with the instruction execution system, apparatus, or device.

Figure 10:
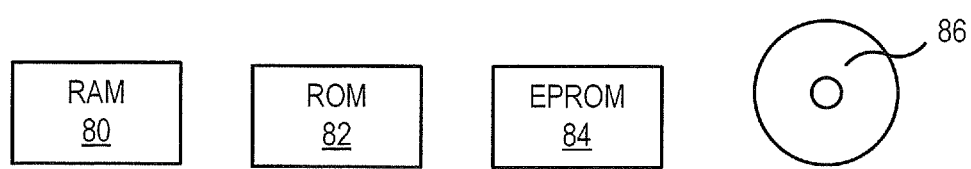
FIG. 10 illustrates storage media in which computer program products according to some embodiments can be embodied.

The computer-usable or computer-readable medium may be, for example but not limited to, an electronic, magnetic, optical, electromagnetic, or semiconductor system, apparatus, or device. For example, as illustrated in FIG. 10, the computer-readable storage medium may include a random access memory (RAM) 80, a read-only memory (ROM) 82, an erasable programmable read-only memory (EPROM or Flash memory) 84, and/or an optical storage disk 86, such as a CD-ROM, DVD-ROM or DVD-RAM.

Exemplary embodiments are described herein with reference to flowchart and/or block diagram illustrations of methods, systems, and computer program products. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A system comprising:
    a network entry point configured to receive and process internet protocol based connection requests originating from outside a communications network; and
    a telephone number mapping database configured to store a uniform resource identifier of the network entry point and to respond to a request for routing information for a subscriber terminal within the communications network received from a remote entity outside the communications network by outputting a naming authority pointer resource record including the uniform resource identifier of the network entry point to the remote entity in response to the request for routing information wherein the uniform resource identifier of the network entry point is different than a uniform resource identifier of the subscriber terminal.

2. The system of claim 1, wherein the network entry point comprises a session border controller that is configured to receive an incoming call setup request to set up a call with the subscriber terminal and to set up the call in response to the incoming call setup request.

3. The system of claim 2, further comprising:
    a private telephone number mapping database configured to store internal routing information for subscriber terminals in the communications network and to respond to requests for routing information from entities within the communications network; and
    an internet protocol multimedia subsystem core configured to manage voice over internet protocol communications sessions;
    wherein the session border controller is configured to forward the incoming call setup request to the internet protocol multimedia subsystem core; and
    wherein the internet protocol multimedia subsystem core is configured to query the private telephone number mapping database to obtain internal routing information for routing the call to the subscriber terminal.

4. The system of claim 3, wherein the internet protocol multimedia subsystem core is configured to forward the internal routing information obtained from the private telephone number mapping database to the session border controller, and the session border controller is configured to establish a connection with the subscriber terminal using the internal routing information provided from the internet protocol multimedia subsystem core.

5. The system of claim 3, further comprising a master telephone number mapping database that is configured to store routing information for subscriber terminals within the communications network and to populate the telephone number mapping database and the private telephone number mapping database.

6. The system of claim 5, wherein the master telephone number mapping database stores routing information for terminals in a plurality of communications systems operated by a communications service provider, at least one of the plurality of communications systems including a mobility communications service.

7. The system of claim 1, wherein the telephone number mapping database is configured to provide a naming authority pointer resource record containing a session initiation protocol uniform resource identifier in response to the request for routing information.

8. The system of claim 3, wherein the internet protocol multimedia subsystem core is further configured to receive an outgoing call setup request from a subscriber terminal within the communications network and to issue a query to the private telephone number mapping database in response to the outgoing call setup request to obtain routing information for a destination terminal specified in the call setup request; and
wherein the private telephone number mapping database is configured to determine whether the destination terminal is located within at least one of the communications network and an external network and, in response to determining that the destination terminal is located within the external network, to issue a query to a telephone number mapping database in the external network to obtain routing information for the destination terminal, the routing information for the destination terminal comprising a uniform resource identifier of a network entry point in the external network.

9. The system of claim 8, wherein the internet protocol multimedia subsystem core is configured to establish the outgoing call through the session border controller in response to the routing information provided by the telephone number mapping database in the external network.

10. The system of claim 3, further comprising a non-internet protocol multimedia subsystem communication facility that is configured to issue a query for routing information to the private telephone number mapping database.

11. A method of establishing an internet protocol-based communications session with a subscriber terminal in a communications network, comprising:
providing a telephone number mapping database that stores a uniform resource identifier of a network entry point in the communications network that receives and processes internet protocol based connection requests originating from outside the communications network;
receiving a request for routing information for the subscriber terminal from a remote entity outside the communications network; and
responding to the request for routing information by outputting a naming authority pointer resource record including the uniform resource identifier of the network entry point to the remote entity wherein the uniform resource identifier of the network entry point is different than a uniform resource identifier of the subscriber terminal.

12. The method of claim 11, further comprising:
receiving an incoming call setup request at the network entry point in the communications network to set up a call with the subscriber terminal; and
setting up the call in response to the incoming call setup request.

13. The method of claim 12, further comprising:
storing internal routing information for subscriber terminals in the communications network at a private telephone number mapping database;
querying the private telephone number mapping database from within the communications network to obtain internal routing information for routing the call to the subscriber terminal; and
establishing a connection with the subscriber terminal using the internal routing information.

14. The method of claim 11, wherein outputting the naming authority pointer resource record comprises outputting a naming authority pointer resource record containing a session initiation protocol uniform resource identifier in response to the request for routing information.

15. The method of claim 13, further comprising:
receiving an outgoing call setup request from a subscriber terminal within the communications network;
issuing a query to the private telephone number mapping database in response to the outgoing call setup request to obtain routing information for a destination terminal specified in the call setup request;
determining whether the destination terminal is located within at least one of the communications network and an external network; and
in response to determining that the destination terminal is located within the external network, issuing a query to a telephone number mapping database in the external network to obtain routing information for the destination terminal, the routing information for the destination terminal comprising a uniform resource identifier of a network entry point in the external network.

16. The method of claim 15, further comprising:
establishing the outgoing call through a session border controller in response to the routing information provided by the telephone number mapping database in the external network.

17. A computer program product comprising a non-transitory computer readable device including computer readable program code for establishing an internet protocol-based communications session with a subscriber terminal in a communications network, the computer readable storage medium comprising:
computer readable program code configured to provide a telephone number mapping database that stores a uniform resource identifier of a network entry point in the communications network that receives and processes internet protocol based connection requests originating from outside the communications network;
computer readable program code configured to receive a request for routing information for the subscriber terminal from a remote entity outside the communications network; and
computer readable program code configured to respond to the request for routing information by outputting a naming authority pointer resource record including the uniform resource identifier of the network entry point to the remote entity wherein the uniform resource identifier of the network entry point is different than a uniform resource identifier of the subscriber terminal.

18. The computer program product of claim 17, further comprising:
computer readable program code configured to receive an incoming call setup request at the network entry point in the communications network to set up a call with the subscriber terminal; and
computer readable program code configured to set up the call in response to the incoming call setup request.

19. The computer program product of claim 18, further comprising:
computer readable program code configured to store internal routing information for subscriber terminals in the communications network at a private telephone number mapping database;
computer readable program code configured to query the private telephone number mapping database from within the communications network to obtain internal routing information for routing the call to the subscriber terminal; and
computer readable program code configured to establish a connection with the subscriber terminal using the internal routing information.

20. The computer program product of claim 19, further comprising:
computer readable program code configured to receive an outgoing call setup request from a subscriber terminal within the communications network;
computer readable program code configured to issue a query to the private telephone number mapping database in response to the outgoing call setup request to obtain routing information for a destination terminal specified in the call setup request;
computer readable program code configured to determine whether the destination terminal is located within the communications network or within an external network; and
computer readable program code configured to issue a query to an telephone number mapping database in the external network to obtain routing information for the destination terminal in response to determining that the destination terminal is located within the external network, the routing information for the destination terminal comprising a uniform resource indicator of a network entry point in the external network.

* * * * *